C. E. COX.
LIQUID LEVEL INDICATOR.
APPLICATION FILED JAN. 19, 1920.
1,397,267.
Patented Nov. 15, 1921.
2 SHEETS—SHEET 1.
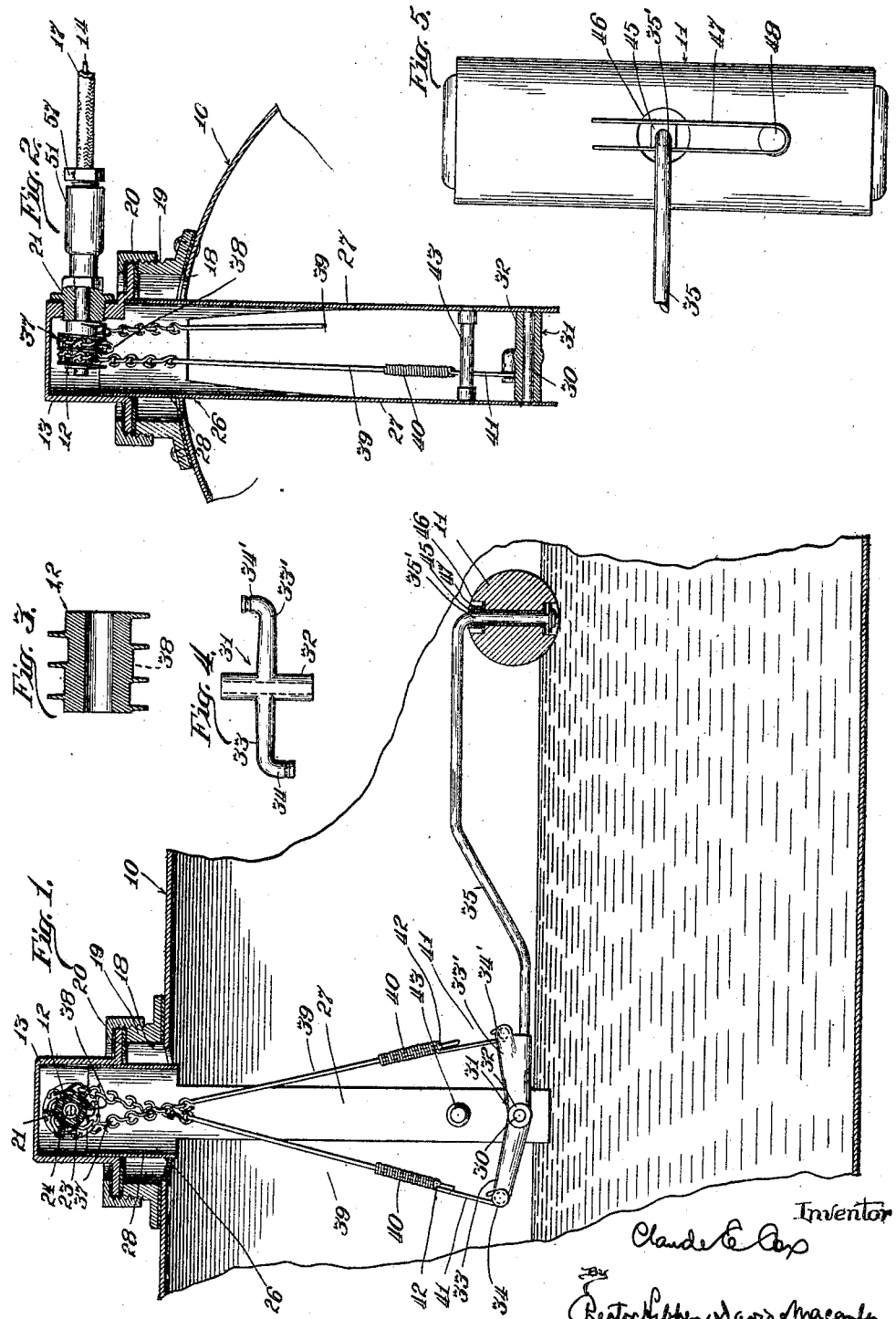

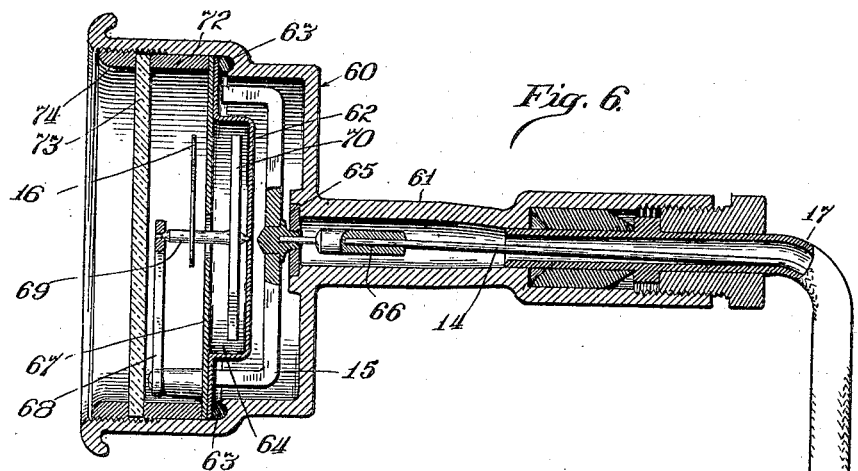
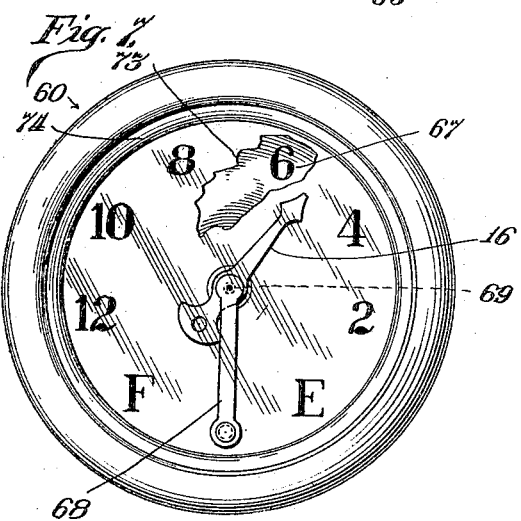
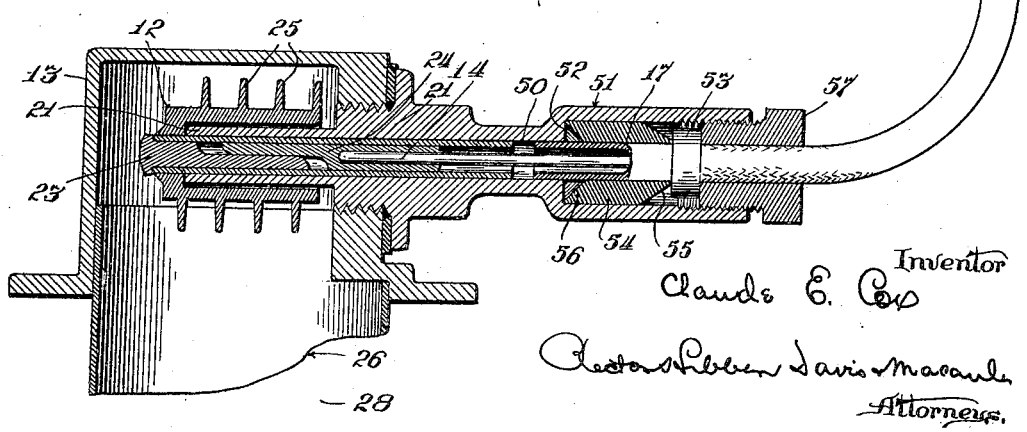

UNITED STATES PATENT OFFICE.

CLAUDE E. COX, OF DETROIT, MICHIGAN.

LIQUID-LEVEL INDICATOR.

1,397,267.    Specification of Letters Patent.    Patented Nov. 15, 1921.

Application filed January 19, 1920. Serial No. 352,400.

*To all whom it may concern:*

Be it known that I, CLAUDE E. COX, a citizen of the United States, residing at Detroit, in the county of Wayne and State of Michigan, have invented certain new and useful Improvements in Liquid-Level Indicators, of which the following is a specification.

My invention relates to liquid level indicators such as may be employed to indicate upon a gage located on the instrument board, the level of gasolene in the supply tank of an automobile, and in some of its features it relates more particularly to indicators for pressure-carrying gasolene tanks.

Among the objects of my invention are to provide an indicator system that may readily be installed in connection with a pressure-carrying gasolene tank and that will operate accurately and effectively. Another object is to provide a simple and effective float assembly mechanism for the transmission of motion from a float to an indicator shaft, a simple and desirable pressure-sealed gage coordinated therewith, and to make the construction satisfactory and available for manufacture in a varying line of sizes and with different assembly relations to satisfy the requirements of different makes of automobiles. A further object of my invention is to improve in general and in detail the structures and combinations of parts requisite in such a pressure-system indicator.

In the drawings wherein I have illustrated, for purposes of disclosure, a single specific embodiment of my invention, Figure 1 is a central vertical section, taken longitudinally of the gasolene tank showing the float assembly; Fig. 2 is a transverse section through the same; Fig. 3 is a detail of a transmission drum; Fig. 4 is a detail of a rocking lever; Fig. 5 is a detail of a float construction; Fig. 6 is a sectional elevation, with parts in section, showing the sealing association of float assembly head and reading gage; and Fig. 7 is a plan view of the reading gage.

The float assembly, mounted on the gasolene tank 10, includes a float 11 and connections by which it communicates motion to a drum 12 within the assembly head 13. This drum has detachable connection with a flexible shaft 14 that extends to the reading gage, and within the gage said flexible shaft is equipped with a magnetic member 15 that will be oscillated as the float rises and falls. The magnet, properly associated with the gage hand or pointer 16 to move the latter, is contained in a sealed chamber of the reading gage, and a ductile, pressure-retaining tube 17, inclosing the flexible shaft 14 runs from connection with said chamber into connection with the head of the float assembly and makes sealing, detachable connection with both thereof in such manner that the tube may readily be varied in length to meet varying installation requirements.

These parts are so constructed and related that the flexible shaft may be inserted through the gage-casing after the latter, the float assembly and the tube have been placed and connected.

Specifically, tank 10 has an aperture 18 surrounded by a flanged collar 19 on which a flange of the assembly head 13 rests and is pressed by threaded ring 20, suitable packing being employed in making this joint to insure its gas-tightness. The drum 12 is supported on the head 13 as shown in Fig. 2, a bearing member 21 entering the head laterally and being constructed both to support the drum and to give externally, a connection to receive the tube 17. Details of the drum mounting I do not claim in this application. Suffice it to say that the hollow drum with its central reëntrant sleeve finds bearing in the bore of the inward projection of member 21, and carries within the sleeve a half-round coupling member or tongue 23 and that this coupling part is detachably engaged by a complemental coupling member 24 that is fixed to the extremity of flexible shaft 14, and is small enough in diameter to be slipped through tube 17 into or out of engagement with the drum-carried part. This drum 12 has an external spiral rib 25 making more than one complete turn and so forming a rather deep spiral groove, the convolutions of which are quite close together.

The assembly head 13 carries a post member 26 extending down below the axial line of the tank. This post member is preferably formed by cutting away a tube to leave two parallel limbs 27, the upper cylindrical part 28 of the tube being fitted into the head, and being secured therein in any suitable way as by soldering. The axis of the drum may be made to stand at any desired angular relation to the float carried by the post, this relation being predetermined and provided for in the manufacture and assembling of the parts, according to the characteristics of different automobiles as to the locations of the gasolene tank.

At about the tank center a shaft 30 spans the post limbs and has mounted thereon a rocking lever 31. This lever comprises an elongated hub 32 bearing on the shaft, and radial arms 33, 33' arranged (in side elevation) at an obtuse angle to each other and (in plan) having oppositely bent connection ends 34, 34' with connection-receptive grooves separated laterally to a degree appropriate to the inclination of the spiral rib on the drum 25. To the rocker-arm limb is rigidly connected the float arm 35 carrying the float 11, and to the angular arms, 33 and 33' are connected the ends of a flexible connector that runs over and is engaged with the drum. Specifically, a length chain 37, makes more than a complete turn about the drum and is soldered as at 38 to the drum at a point that is never unwrapped from the drum in the movement of the parts. This chain has hooked to its ends two straight wire members 39 each of which is engaged, above its lower end, by a coil 40 of an end-piece 41 that hooks onto the contiguous connector 34 or 34' of the rocker lever. The coil 40 engages the wire 39 with such a frictional grip that, in assembly, there is ample tenacity to hold the parts together for all test operations, but preferably a solder drop 42 is applied to permanently fix the adjustment when the assembly is complete.

It will be observed that the arms 33, 33' may be made of just such radial length that the movement of the float 11 through a given angular excursion will impart to the drum 12 any given number of degrees of rotation, and in practice I prefer that the construction shall be so designed that the range of oscillatory motion of the two arm levers 31 in ordinary operation will not exceed 90° while the drum makes nearly a complete turn, the accommodation of motion within this range to the requirement of any particular tank being attained by properly determining the effective length of the float arms. A stop pin 43 may be mounted between the post arms to prevent complete over-throwing of the rocker arm, and it will be observed that when the rocker arm is moved to its extreme limit, into contact with the stop pin 43, such rocker arm is brought close enough into alinement with the post to permit of the ready insertion of the assembly through the aperture 18 in the tank. Also, to facilitate this sort of insertion of the assembly, the float is preferably mounted in the special manner illustrated. The float arm 35 is so bent that its extremity 35' stands vertical and makes pivotal connection with the middle of the float. On this vertical portion 35' of the arm is rigidly secured a squared head 45. This head lies in a recess 46 in the float and its sides are engaged by a U-shaped leaf-spring 47 that is arranged in the float-recess and held in position by a pin 48. When the float is in the position illustrated in the drawing it is latched in transverse position by the spring, but obviously it may be turned, to a position paralleling the float arm, in which position it may readily be moved through the opening 18 in the tank.

It will be apparent that were the two arms 33 and 33' arranged in a straight line, and the link-and-chain connection so adjusted as to be taut or snug when the float is in horizontal position, then the elevation or depression of the float would loosen the connection, tending to admit of lost motion, and this looseness would continue through the full effective range of float movement. By setting the arms at an obtuse angle to each other as shown this loosening tendency is minimized, and the construction as illustrated may show the same snugness or tautness of the chain at the extremes of movement of the float that it does when the float is in mid-position, there being of course a slight loosening tendency between these points. In building the device commercially, the rocker arms, being small and inexpensive castings, may most conveniently be provided all of the same arm-length, consistent with the standard diameter of the drum 12, but with a range of different obtuse angles to satisfy the slight variation of angle that should be met according to differences in effective length of the post and also according to varying angles between the plane of movement of the float arm and the vertical plane through the axis of the drum. Furthermore, with any given coördination of rocker arm and drum, the drum surface may be cam cut, as is indicated by the section in Fig. 3, where the surfaces of the grooves do not lie in a single cylindrical surface, the cam cut being so laid out that the chain may be taut throughout the entire range of movement. In practice I do not find this last mentioned refinement to be necessary for automobile gages, though it may be desirable for very fine and accurate job.

The bearing member 21 of the float assembly head and the stem of the reading gage have like provisions for making sealing connection with the tube 17. Each has a smaller bored portion 50 snugly to receive and guide the end of the tube 17, a larger bored portion 51 and a shoulder 52 intervening between these two bores. A collar 53 is securely fastened to the tube, as by soldering, at a suitable distance from its end and between this collar and the shoulder 52 a ductile metal sleeve 54 is placed. This sleeve has a conical boss 55 at one extremity and a conical recess 56 at its other end, so making substantially sharp edges at the inner periphery of one end of the sleeve and at the outer periphery of its other end. A threaded plug 57, surrounding the tube, engaging the threads of larger bore 51, and bearing against the collar 53 presses the latter upon the ductile sleeve, with sufficient pressure to deform its sharp-edged ends sufficiently to insure sealing contact between the parts, but without such wedging of the sleeve or such deformation thereof as to prevent either the ready separation of the joint or the prompt re-assembling of the parts into sealing relation. The construction shown permits separation and reassembly many times before the ductile sleeve needs renewal.

The reading gage casing 60 preferably has a tube receiving stem 61 made integral therewith, and is so constructed that before its parts are assembled the flexible shaft 14 may be inserted through the stem and tube. The casing is divided into inner and outer chambers by a partition wall 62 of non-magnetic material, making sealing connection with the outside wall of the casing as by means of a packing ring 63. This partition wall has a recess 64 therein so that the inner chamber, in rear thereof, is of shallow U-shape in cross-section, and in such chamber the U-shaped magnet is mounted with its ends extending beyond the plane of the rear wall of the recess. The hub of this magnet bears in a small plate 65 seated in a recess surrounding the stem-opening and readily demountable therefrom, a suitable coupling 66 being made through this plate to join the flexible shaft 14 to the magnet. Thus, with the tank assembly complete, the pipe seals screwed home, and the magnet, plate 65, and flexible shaft properly assembled, the flexible shaft may be threaded through the tube to make its slip-coupling with the drum-shaft before the rest of the gage is assembled.

By so disposing the magnet and armature that one of them is U-shaped and extends past the end of the flat coöperating element (on the opposite side of the intervening partition) the magnetic attraction does not draw the hand carrying shaft against its bearing, and so friction in this respect is minimized.

A dial plate 57 overlies the recess 64 and carries a bracket arm 68 between which and the partition wall an arbor 69 finds bearing. Within the recess 64 this arbor is provided with an armature-bar or complemental magnet 70 and beyond the dial it carries gage hand 16. To complete the gage assembly, a ring 72 is screwed down in the casing, glass 73 is laid thereon, and the finishing ring 74 screwed in.

While I have herein described in considerable detail a specific embodiment of my invention it will be understood that changes may be made in specific construction within the scope of the appended claims without departure from my invention.

I claim:

1. In a pressure-system liquid-level indicator of the character described, the combination of a gage casing having an opening and a hollow stem, a removable sealing partition, a magnet in rear of said partition, and an armature and hand in front of said partition; a flexible shaft connected with said magnet and having a slip coupling member on its remote end, said shaft being of sufficient length to extend to the gasolene tank, a tank-float assembly having a head, a transmission part carried thereby provided with a complemental coupling member to receive the shaft-carried member, a ductile tube inclosing the flexible shaft, and detachable seal-couplings between opposite ends of said tube and, respectively, the tank assembly head and the gage-stem.

2. In a pressure-system gasolene level indicator, the combination of a gage casing having an opening and a hollow stem, a removable sealing partition, a magnet detachably mounted in front of said opening and back of one partition, an armature and hand mounted in front of said partition, a gasolene tank having an opening, an assembly-head for closing the same, a tube extending from assembly head to gage stem and sealed thereto, one sealing connection being detachable, a post carried by said assembly head, float mechanism carried by said assembly head and insertible with the post through the tank-opening, a transmission member actuated by said float mechanism and carried by said assembly head, and a flexible shaft extending from said transmission member through said tube to the magnet and having connections with both thereof, one said connection comprising slip-coupler members endwise detachable.

3. In a liquid level indicator, the combination of a gage, a gage-turning shaft and a float assembly for connection with a gasolene tank comprising a shaft-driving drum, a head carrying said drum and carrying a post, a two-armed rocker lever mounted in said post, a float connected to said lever, and connections between the rocker arm ends flexibly engaging the drum.

4. In a liquid level indicator, the combination of a gage, a gage-operating shaft, and a float assembly for connection with a gasolene tank comprising a shaft-driving drum, a head carrying said drum and carrying a post, a two-armed rocker lever mounted in said post and having its arms disposed at an obtuse angle to each other, and connections between the two rocker arm ends flexibly engaging the drum.

5. In a liquid level indicator, the combination of a gage, a shaft, and a float assembly for connection with a gasolene tank, said assembly comprising a drum having a spiral groove connected with said shaft, a head carrying the drum and carrying a post, a two-arm rocker lever mounted on said post, a float connected to said lever, and connections between the ends of the rocker arm engaging, and more than once flexibly encircling the drum.

6. In a liquid level indicator, a gage, a shaft, and a float assembly for connection with a gasolene tank, said assembly comprising a drum connected with said shaft, a head carrying the drum, a post, a rocker lever carried by the post, said head and post adapted for assembly to make the turning axes of the drum and the lever stand at different angles to each other, said drum having a spiral groove and said lever having two arms disposed at an obtuse angle to each other, in elevation and with their ends laterally separated in plan, and a connector secured at its ends to the lever arm and passing around and secured to the grooved drum.

7. In a liquid level indicator, a gage, a drum connected to move its hand, a float, a rocking lever connected to be moved by the float, and a flexible connection comprising a chain portion running around the drum and secured thereto and link members connecting said chain with the opposite lever arms.

8. In a liquid level indicator, a gage, a drum connected to move its hand, a float, a rocking lever connected to be moved by the float, and a flexible connection comprising a chain portion running around the drum and secured thereto, link members connecting said chain with the opposite lever arm, one of said link members comprising a section having a straight end and a complemental section having a coiled end, its coil being of a size to snugly engage the straight end of the first said section.

9. The combination with a gasolene tank having an aperture of a head secured to close said aperture and having a post extending into the tank, a drum mounted in said head, an indicator a transmission shaft connected with said drum and extending beyond said head, a lever pivoted in the post between its ends, said lever being of a length greater than the diameter of the tank orifice and movable to position for insertion through said orifice, flexible means connecting the ends of said lever with the drum, and a float, insertible through the orifice in the gasolene tank, connected with said lever.

10. In a liquid level indicator, the combination of a gage, a drum connected thereto, a float, a two armed rocker lever actuated by the float and a flexible connection from the arms passing over the drum, said drum having a cam surface for keeping the connection taut.

11. In a device of the character described, a float-arm, a relatively long slender float pivoted thereon between its ends, and means for yieldingly holding said float in position either parallel to or transverse to the arm.

12. In a device of the character described, a float-arm a relatively long and slender float pivoted thereon between its ends and having a recess, a spring in said recess and a polygonal part on the float arm engaged by said spring, yieldingly to hold the float in positions parallel with or transverse to the float-arm.

13. In a liquid level indicator, a float, a shaft operated thereby, and a gage, comprising a shell, a recessed, non-magnetic partition therein, a U-shaped magnet connected with said shaft and arranged in said shell with its ends extending up beside the partition recess, an armature in said recess, a dial overlying the armature, and a hand, overlying the dial connected with said armature.

14. In a liquid level indicator, a tank, a gage casing, gas tight tube-connections from the tank to the casing, a tank-float, a U-shaped magnet in the gage-casing, a flexible shaft running through said tube and connected to be moved by the float and to move the magnet, a sealing-partition in the gage casing recessed to extend between the ends of the magnet, a dial overlying the partition and spaced from the recess bottom, an armature mounted to work in said space, and a hand connected with said armature and working in front of the dial.

CLAUDE E. COX.